US007559310B2

(12) United States Patent
Yahata

(10) Patent No.: US 7,559,310 B2
(45) Date of Patent: Jul. 14, 2009

(54) ENGINE FUEL PUMP CONTROL APPARATUS

(75) Inventor: Takanobu Yahata, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 12/060,988

(22) Filed: Apr. 2, 2008

(65) Prior Publication Data

US 2008/0257313 A1    Oct. 23, 2008

(51) Int. Cl.
*F02M 37/04*  (2006.01)
(52) U.S. Cl. ...................... 123/446; 123/497
(58) Field of Classification Search ............ 123/445, 123/446, 497
See application file for complete search history.

(56) References Cited

U.S. PATENT DOCUMENTS

| 4,029,070 | A  | * | 6/1977  | Kobayashi ............... 123/445 |
| 4,874,013 | A  | * | 10/1989 | Hack, Jr. ................. 137/571 |
| 6,253,739 | B1 | * | 7/2001  | Golomb et al. .......... 123/509 |
| 6,536,415 | B2 | * | 3/2003  | Joos et al. ............... 123/497 |
| 6,609,500 | B2 | * | 8/2003  | Ricco et al. ............. 123/446 |
| 6,941,922 | B2 | * | 9/2005  | Williams et al. ........ 123/196 R |
| 6,971,373 | B2 | * | 12/2005 | Mudway et al. ......... 123/497 |
| 7,114,490 | B2 | * | 10/2006 | Zdroik .................... 123/497 |
| 7,281,520 | B2 | * | 10/2007 | Klenk et al. ............. 123/446 |
| 7,392,794 | B2 | * | 7/2008  | Hazama .................. 123/497 |
| 2007/0283935 | A1 | * | 12/2007 | Yuda et al. ............. 123/497 |

FOREIGN PATENT DOCUMENTS

JP        2003-293877 A    10/2003

* cited by examiner

*Primary Examiner*—Thomas N Moulis
(74) *Attorney, Agent, or Firm*—Global IP Counselors, LLP

(57) ABSTRACT

An engine control fuel pump apparatus is provided with a low load fuel pump control section, a high load fuel pump control section and a subordinate pump drive section. The low load fuel pump control section controls a main fuel pump for supplying fuel to an engine when an engine operating condition indicates that the engine is operating with a low load. The high load fuel pump control section controls the main fuel pump and a subordinate fuel pump for supplying fuel to the engine when an engine operating condition indicates that the engine is operating with a high load. The subordinate pump drive section drives the subordinate fuel pump for a prescribed period of time when a rotational speed of the engine is equal to or higher than a prescribed rotational speed while the engine is operating in an low load operating region in which the low load fuel pump control section controls the main fuel pump for supplying fuel to the engine.

11 Claims, 9 Drawing Sheets

ENGINE FUEL PUMP CONTROL APPARATUS

CROSS-REFERENCE TO RELATED APPLICATIONS

This application claims priority to Japanese Patent Application No. 2007-110442, filed on Apr. 19, 2007. The entire disclosure of Japanese Patent Application No. 2007-110442 is hereby incorporated herein by reference.

BACKGROUND OF THE INVENTION

1. Field of the Invention

The present invention generally relates to a fuel pump control apparatus for an engine. More specifically, the present invention relates to an engine fuel pump control apparatus that controls a main fuel pump and a subordinate fuel pump.

2. Background Information

A conventional fuel pump control apparatus has a main fuel pump arranged in a main fuel tank and a subordinate fuel pump arranged in a subordinate fuel tank for supplying fuel to an engine (e.g., Japanese Laid-Open Patent Publication No. 2003-293877). This conventional fuel pump control apparatus normally uses fuel from the main fuel tank. A driver operated switch is provided such that the driver can operate the subordinate fuel pump to use fuel from the subordinate fuel tank when the amount of fuel remaining in the main fuel tank becomes low.

Since only the fuel in the main fuel tank is used to run the engine under normal circumstances, the subordinate fuel pump goes for long periods of time without being used and could possibly become seized. Therefore, the existing fuel pump control apparatus attempts to solve the problem of the subordinate fuel pump becoming seized. Specifically, the conventional fuel pump control apparatus drives the subordinate fuel pump in coordination with a signal issued from an ignition switch when the engine is started. In this way, the fuel pump provided in the subordinate fuel tank is periodically operated to prevent it from becoming seized.

In view of the above, it will be apparent to those skilled in the art from this disclosure that there exists a need for an improved air-fuel ratio control apparatus. This invention addresses this need in the art as well as other needs, which will become apparent to those skilled in the art from this disclosure.

SUMMARY OF THE INVENTION

In view of the conventional technology, a fuel pump control apparatus has developed to supply fuel to an engine by controlling a main fuel pump when an engine operating condition indicates that the engine is operating with a low load and to supply fuel to the engine by controlling both the main fuel pump and a subordinate fuel pump when an engine operating condition indicates that the engine is operating with a high load.

However, with this fuel pump control apparatus, there is also a possibility that the subordinate fuel pump could seize because, depending on the driver of the vehicle, the frequency at which the engine is used in a high load region might be very infrequent. If the engine is not used in a high load region very often, i.e., if the engine is used only in a region where the required amount of fuel is small, then the frequency with which the subordinate fuel pump is used will be small and it could become seized, similar to the fuel pump control apparatus disclosed in Japanese Laid-Open Patent Publication No. 2003-293877.

The existing technology disclosed in Japanese Laid-Open Patent Publication No. 2003-293877 seeks to avoid seizing of the fuel pump by driving both the fuel pump provided in the main fuel tank and the fuel pump provided in the subordinate fuel tank when the engine is started, which is a time when the engine rotational speed is low. Since the engine noise is comparatively low when the fuel pumps are driven in this manner, the operating sound of the pumps is noticeable as noise to passengers in the vehicle.

The present invention was conceived in view of this problem associated with the existing technology. One object is to reduce the occurrence of fuel pump seizing while suppressing the operating sound of the fuel pumps when they are operated in order to prevent seizing.

In view of the above, an engine control fuel pump apparatus is provided that basically comprises a low load fuel pump control section, a high load fuel pump control section and a subordinate pump drive section. The low load fuel pump control section is configured to control a main fuel pump for supplying fuel to an engine when an engine operating condition indicates that the engine is operating with a low load. The high load fuel pump control section is configured to control to the main fuel pump and a subordinate fuel pump for supplying fuel to the engine when an engine operating condition indicates that the engine is operating with a high load. The subordinate pump drive section is configured to drive the subordinate fuel pump for a prescribed period of time when a rotational speed of the engine is equal to or higher than a prescribed rotational speed while the engine is operating in an low load operating region in which the low load fuel pump control section controls the main fuel pump to for supplying fuel to the engine.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
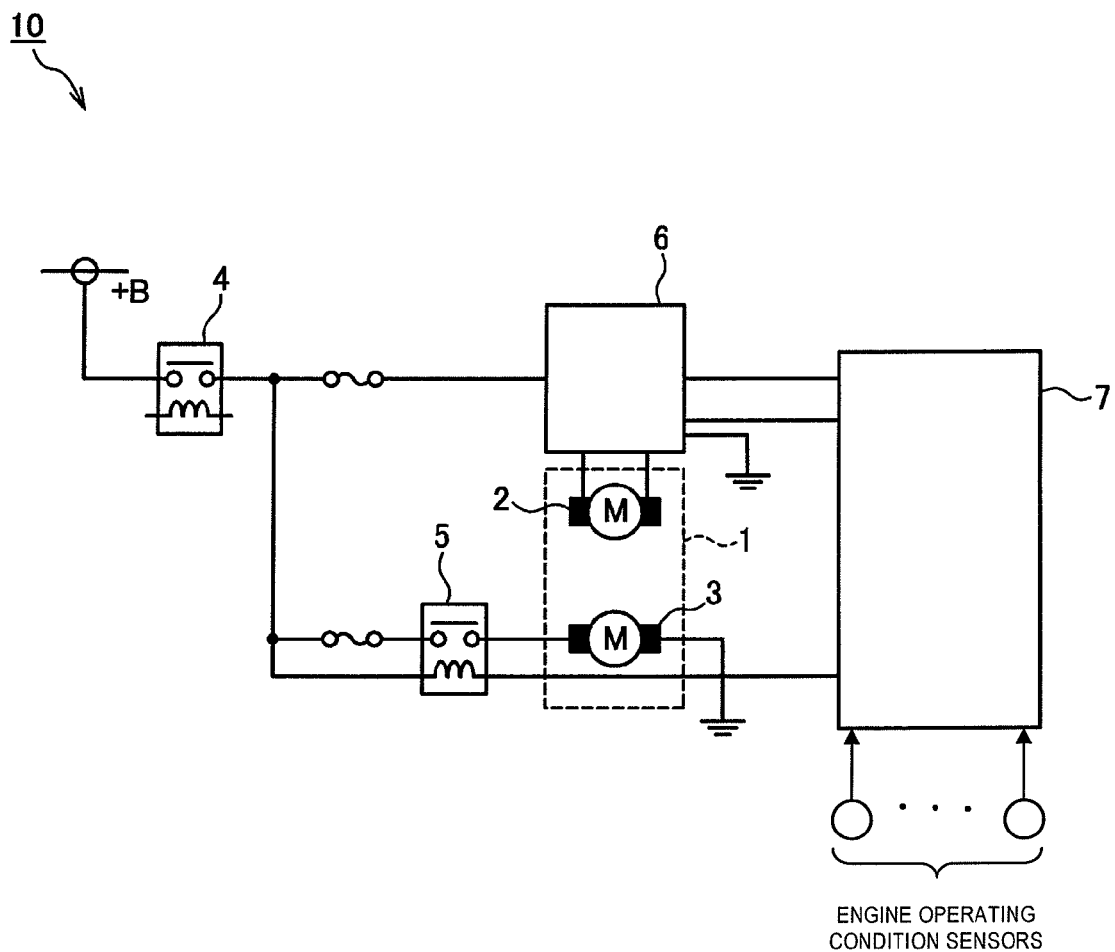
FIG. 1 is a schematic view showing an engine fuel pump control apparatus in accordance with a first embodiment.

Referring initially to FIG. 1, an engine fuel pump control apparatus 10 is schematically illustrated in accordance with a first embodiment. As shown in FIG. 1, the engine fuel pump control apparatus 10 basically comprises a fuel tank 1, a main fuel pump 2, a subordinate fuel pump 3, an ignition relay 4, a subordinate pump drive relay 5, a pump flow rate control device 6, and a controller 7. The fuel tank 1 stores fuel to be supplied to an engine via the main fuel pump 2 and the subordinate fuel pump 3.

The main fuel pump 2 and the subordinate fuel pump 3 are fuel pumps provided inside the fuel tank 1. The main fuel pump 2 and the subordinate fuel pump 3 serve to pump fuel to the engine. The main fuel pump 2 is always driven while the engine is running.

Basically, the engine fuel pump control apparatus 10 supplies fuel to the engine by controlling the main fuel pump 2 when an engine operating condition indicates that an amount of fuel required by the engine is small and to supply fuel to the engine by controlling the main fuel pump 2 and the subordinate fuel pump 3 when an engine operating condition indicates that the amount of fuel required by the engine is large. The controller 7 is preferably programmed to form a subordinate pump drive section that drives the subordinate fuel pump 3 for a prescribed period of time when a rotational speed of the engine is equal to or higher than a prescribed rotational speed while the engine is operating in an operating region in which the amount of fuel required is small and the fuel is supplied to the engine by controlling the main fuel pump 2.

Since the subordinate fuel pump 3 is forcefully driven for a prescribed period of time regardless of the operating region when the engine speed is at a prescribed rotational speed or higher, the subordinate fuel pump 3 does not go for long periods of time without being operated and seizing of the subordinate fuel pump 3 can be prevented. Additionally, as explained below, since the subordinate fuel pump 3 is forcefully driven when the engine speed is at or above a prescribed rotational speed and the noise level is high, the operating sound of the subordinate fuel pump 3 is less noticeable to passengers of the vehicle.

The pump flow rate control device 6 is a fuel pump control module that hereinafter will be called "FPCM" 6. The FPCM 6 changes the output flow rate of the main fuel pump 2 in accordance with an engine operating condition. In this embodiment, the FPCM 6 switches the output flow rate of the main fuel pump 2 among three different levels by controlling a voltage applied to the main fuel pump 2.

The subordinate fuel pump 3 is driven when the engine is operating in a region where the amount of fuel required by the engine cannot be adequately supplied with the output flow rate of the main fuel pump 2 alone. Therefore, the subordinate fuel pump 3 is driven chiefly in a high load operating region.

The ignition relay 4 turns on (enters a connected state) when a driver turns an ignition switch to an ON position.

The subordinate pump drive relay 5 turns on when the engine is operating in a high load operating region where the amount of fuel required by the engine cannot be adequately supplied with the output flow rate of the main fuel pump 2 alone. The subordinate fuel pump 3 is driven (runs) when the subordinate pump drive relay 5 turns on.

The controller 7 serves to control the FPCM 6 and switches the subordinate pump drive relay 5 on and off in accordance with some operating conditions. Consequently, signals from various sensors are fed to the controller 7. Based on the input signals fed thereto, the controller 7 calculates an engine rotational speed, a fuel injection quantity, an engine torque, an engine load, a coolant temperature, and an air fuel ratio learning (feedback) condition.

Figure 2:
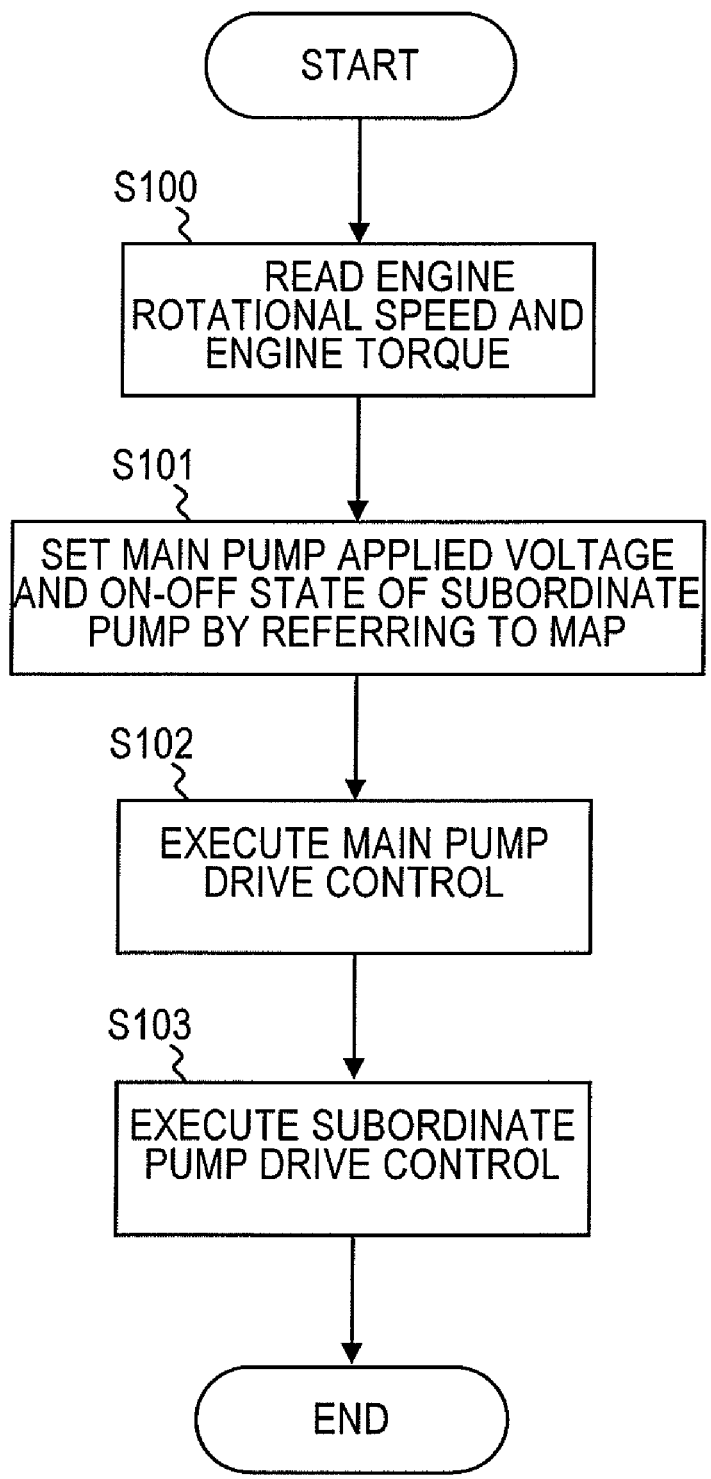
FIG. 2 is a flowchart showing a drive control executed with respect to a main pump and a subordinate pump.

The control processing executed by the controller 7 in order to drive the main fuel pump 2 and the subordinate fuel pump 3 will now be explained. FIG. 2 is a flowchart showing control processing in accordance with the first embodiment for driving the main fuel pump 2 and the subordinate fuel pump 3. The controller 7 executes this control processing once per prescribed unit of time (e.g., every 10 milliseconds) whenever the ignition switch is in the ON position.

In step S100, the controller 7 reads the engine rotational speed and the engine torque.

In step S101, the controller 7 refers to a map that plots the applied voltage of the main fuel pump 2 and the on-off setting of the subordinate fuel pump 3 with respect to the engine rotational speed and the engine torque. Using the map, the controller 7 sets the applied voltage of the main fuel pump 2 and the on-off state of the subordinate fuel pump 3 based on the engine rotational speed and the engine torque read in step S100. The map will be explained later with reference to FIG. 3.

In step S102, the controller 7 executes drive control of the main pump. More specifically, the controller 7 sends a command value to the FPCM 6 such that the voltage set in step S101 is applied to the main fuel pump 2. As a result, the main fuel pump 2 discharges a fuel quantity corresponding to the applied voltage. Step S102 constitutes a low load fuel pump control section of controller 7.

In step S103, the controller 7 executes drive control of the subordinate pump. More specifically, the controller 7 turns the subordinate pump drive relay 5 on or off based on the on-off setting of the subordinate fuel pump 3 determined in step S101. Steps 102 and S103 cooperate together to constitute a high load fuel pump control section of controller 7.

Figure 3:
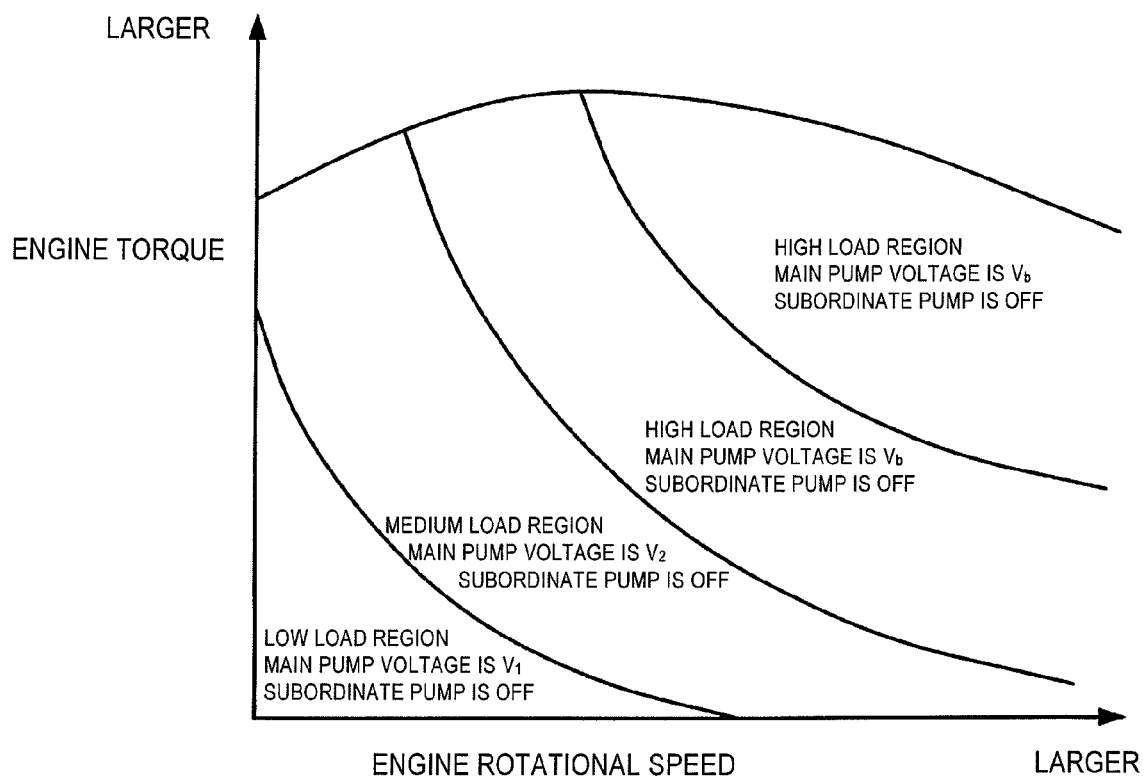
FIG. 3 is a map that plots an applied voltage of the main pump and an on-off setting of the subordinate pump with respect to an engine rotational speed and an engine torque.

FIG. 3 is a map that plots the applied voltage of the main fuel pump 2 and the on-off setting of the subordinate fuel pump 3 with respect to the engine rotational speed and the engine torque.

As shown in FIG. 3, the voltage applied to the main fuel pump 2 is set to one of the voltages $V_1$ to $V_b$ depending on the operating region. When the engine is operating in a low load region, the FPCM 6 applies a terminal voltage of VI volts to the main fuel pump 2. When the engine is operating in a medium load region, the FPCM 6 applies a terminal voltage of $V_2$ volts to the main fuel pump 2. When the engine is operating in a high load region, the FPCM 6 applies a terminal voltage of $V_b$ volts to the main fuel pump 2. The voltage $V_b$ is substantially equal to the battery voltage. The sizes of the applied voltages are related as follows: $V_1 < V_2 < V_b$. The larger the applied voltage is, the higher the rotational speed of the main fuel pump 2 becomes and the larger the output flow rate becomes.

The subordinate fuel pump 3 is turned on when the engine is operating in a high load region in which the amount of fuel consumed is particularly large (hereinafter called the "subordinate pump drive region").

However, if the subordinate fuel pump 3 is only driven when the engine is in the subordinate pump drive region, then the subordinate fuel pump 3 will never be driven when the engine is operating in the low and medium load regions, which is where the engine operates normally. Under such a control scheme, depending on the how the vehicle is used, it would be possible for a long period of time to pass without the subordinate pump being driven. If the subordinate fuel pump 3 is not driven for a long time, then will be possible for the properties of the fuel inside the subordinate fuel pump 3 to change and gum-like components to adhere to the rotor of the subordinate fuel pump 3, causing the subordinate fuel pump 3 to become seized.

Therefore, in the present invention, the subordinate fuel pump 3 is driven forcefully for a prescribed amount of time once per trip (between when the engine is started and stopped) when the engine speed is equal to or higher than a prescribed rotational speed regardless of the operating region of the engine. In this way, the subordinate fuel pump 3 is prevented from seizing even though it is not normally driven when the engine is operating in the low and medium load regions. The forced drive control of the subordinate fuel pump 3 will now be explained.

Figure 4:
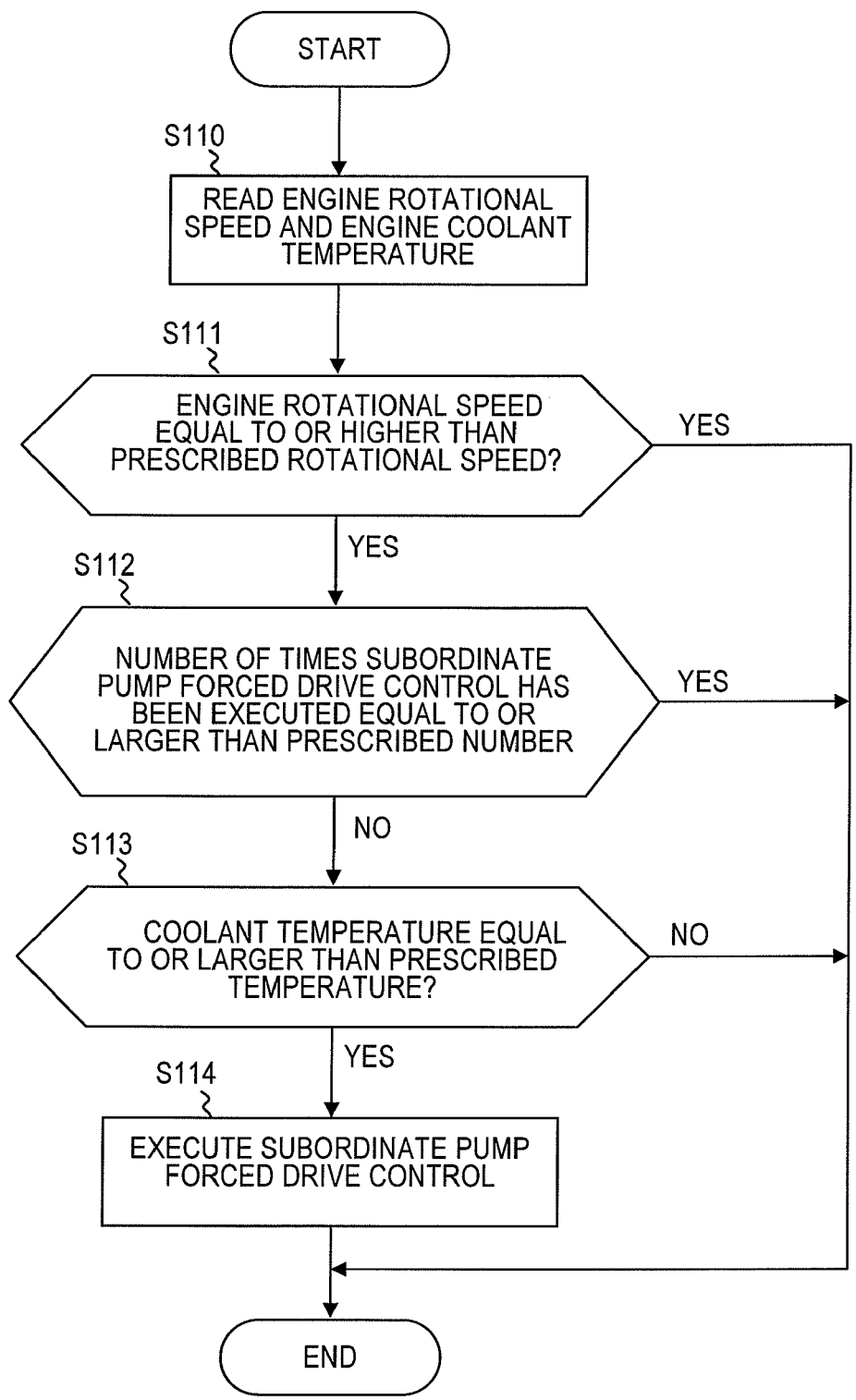
FIG. 4 is a flowchart showing a subordinate pump forced drive control in accordance with the first embodiment.

FIG. 4 is a flowchart showing the forced drive control executed with respect to the subordinate fuel pump 3 by the controller 7 in the first embodiment. The controller 7 executes this forced drive control in parallel with normal drive controls of the main fuel pump 2 and the subordinate fuel pump 3.

In step S110, the controller 7 reads the engine rotational speed and the engine coolant temperature.

In step S111, the controller 7 determines if the engine rotational speed is equal to or above a prescribed rotational speed. The controller 7 proceeds to step S112 if the engine rotational speed is equal to or higher than the prescribed rotational speed and ends the current control cycle if the engine rotational speed is smaller than the prescribed rotational speed.

In step S112, the controller 7 determines if the number of times the forced drive control of the subordinate fuel pump 3 has been executed during the current trip is equal to or larger than a prescribed number of times. More specifically, for example, the controller 7 determines if the number of times the forced drive control of the subordinate fuel pump 3 has been executed is equal to or larger than 1. If the number of times the forced drive control of the subordinate fuel pump 3 has been executed is equal to or larger than the prescribed number, then the controller 7 ends the current control cycle. Otherwise (if the number of times is smaller than the prescribed number), the controller 7 proceeds to step S113.

In step S113, the controller 7 determines if the engine coolant temperature is equal to or above a prescribed temperature. The controller 7 proceeds to step S114 if the engine coolant temperature is equal to or higher than the prescribed temperature and ends the current control cycle if the engine coolant temperature is smaller than the prescribed temperature. Step S114 constitutes a subordinate pump drive section of the controller 7.

In step S114, the controller 7 executes forced drive control of the subordinate fuel pump 3. More specifically, the controller 7 turns the subordinate pump drive relay 5 on for a prescribed amount of time. As a result, the subordinate fuel pump 3 is forcefully driven for a prescribed amount of time.

Figure 5:
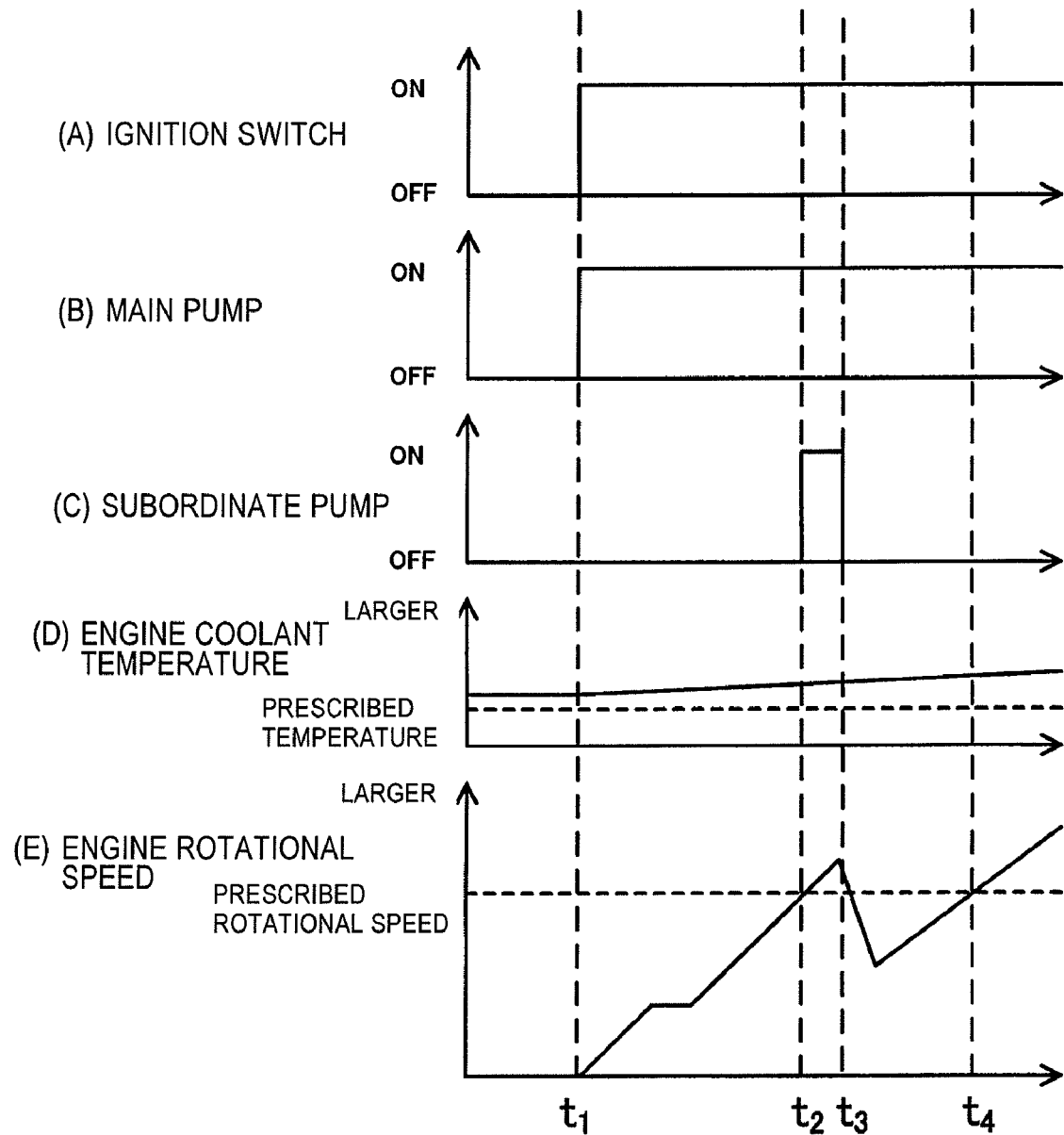
FIG. 5 is a time chart illustrating the operations of the various components during forced drive control of the subordinate pump in accordance with the first embodiment.

FIG. 5 is a time chart illustrating the operations of the various components during forced drive control of the subordinate fuel pump 3 in accordance with the first embodiment of the present invention.

At a time t1, a driver turns the ignition switch to the ON position (see, part (A) of FIG. 5) and a terminal voltage set based on the engine rotational speed and the engine torque at that time is applied to the main fuel pump 2 (see, part (B) of FIG. 5, steps S101 and S102). In the time chart, the main fuel pump 2 is indicated to be ON when a terminal voltage is applied thereto, i.e., when the main fuel pump 2 is running, and OFF when the main fuel pump 2 is not running.

At a time t2, the engine rotational speed exceeds a prescribed rotational speed (see, part (E) of FIG. 5, "Yes" in step S111, e.g., 3500 rpm) and the subordinate pump drive relay 5 is turned on for a prescribed amount of time because the number of times the subordinate fuel pump 3 has been forcefully driven during the current trip is 0 (see, part (C) of FIG. 5, "No" in step S112) and the engine coolant temperature is equal to or higher than a prescribed temperature (see, part (D) of FIG. 5, "Yes" in step S113, e.g., 50 degrees). As a result, the subordinate fuel pump 3 is forcefully driven for a prescribed amount of time (see, part (C) of FIG. 5, step S114, e.g., around 2 seconds) when the engine is in a stabilized state. The amount of time for which the subordinate fuel pump 3 is forcefully driven is set in view of such factors as the effect running the subordinate fuel pump 3 will have on the air fuel ratio and how much time is required for the fuel inside the subordinate fuel pump 3 to be circulated.

At a time t3, the prescribed amount of time elapses and the subordinate pump drive relay 5 is turned off, thus ending the forced drive control of the subordinate fuel pump 3 (see, part (D) of FIG. 5, step S114).

At a time t4, the engine rotational speed again exceeds the prescribed rotational speed (see, part (E) of FIG. 5, "Yes" in step S111), but the forced drive control of the subordinate fuel pump 3 is not executed because the forced drive control has already been executed once during the current trip (see, part (C) of FIG. 5, "Yes" in step S112). The kind of deterioration of the fuel properties that causes the subordinate fuel pump 3 to seize occurs when the subordinate fuel pump 3 is left sitting without being driven for a long period of time (e.g., approximately ten days). Therefore, executing the forced drive control of the subordinate fuel pump 3 at lease once per trip is sufficient to avoid pump seizing. Limiting the number of times the force drive control of the subordinate fuel pump 3 is executed also enables the electric power consumption to be reduced. Furthermore, reducing the number of times the subordinate pump drive relay 5 is operated can preserve the reliability of the subordinate pump drive relay 5.

In the embodiment described above, when the engine rotational speed is equal to or above a prescribed rotational speed, the subordinate fuel pump 3 is forcefully driven for a prescribed amount of time regardless of the operating region of the engine. As a result, the subordinate fuel pump 3 does not go for a long period of time without being operated and seizing of the subordinate fuel pump 3 can be prevented.

Since the forced drive control of the subordinate fuel pump 3 is executed when the engine rotational speed is above a prescribed rotational speed where such background noises as air flow noise and road noise are large, the operating sound of the subordinate fuel pump 3 is less noticeable to passengers of the vehicle.

The embodiment described above can also reduce the load imposed on the battery because the forced drive control of the subordinate fuel pump 3 is not executed when the engine is started, which is a time when the current consumption is high.

Limiting the number of times the forced drive control of the subordinate fuel pump 3 is executed also enables the current consumption to be reduced while still preventing the subordinate fuel pump 3 from becoming seized. By limiting the number of times the forced drive control is executed to one per trip, the number of times the subordinate pump drive relay 5 is operated can be held to the minimum necessary and the reliability of the relay 5 can be ensured.

Second Embodiment

A forced drive control for the subordinate fuel pump 3 that is in accordance with a second embodiment will now be explained with reference to FIG. 6. This embodiment differs from the first embodiment in that forced driving of the subordinate fuel pump 3 is prohibited during purging of evaporated fuel gas. The second embodiment will be explained chiefly based on its differences with respect to the first embodiment. Parts of the second and subsequent embodiments that achieve the same functions as the parts of the first embodiment are indicated with the same reference numerals and explanations thereof are omitted for the sake of brevity.

There are times when the controller 7 purges adsorbed fuel vapor from a canister into an intake passage by executing a purge control while the engine is running. When the purge control is executed, the amount of fuel delivered to the engine increases in accordance with the amount of purged fuel vapor and the air fuel ratio shifts to a richer value. Consequently, the exhaust emissions (e.g., NOx) worsen. During the purge control, the controller 7 learns a relationship between the purge rate and the amount by which the air fuel ratio shifts and revises the fuel injection quantity based on a learned value expressing the relationship.

During the forced drive control of the subordinate fuel pump 3, the amount of fuel pumped from the fuel tank 1 (hereinafter called "output fuel quantity") increases in accordance with the output flow rate of the subordinate fuel pump 3. A pressure regulator that controls the fuel pressure of the fuel injected from the fuel injectors of the engine is contrived such that the control fuel pressure increases when the output fuel quantity increases. Thus, if the injection time of the injectors is the same, then the fuel injection quantity will increase.

Consequently, if the subordinate fuel pump 3 is forcefully driven during the purge control, then an accurate learning value expressing the effect of the purging on the air fuel ratio will not be obtainable because driving the subordinate fuel pump 3 causes the fuel injection quantity to increase and the increase in the fuel injection quantity will be interpreted as an increase caused by the purged fuel vapor. The inaccurate purge learning value will then be used the next time the purge control is executed, thus causing the exhaust emissions to worsen.

Therefore, this embodiment prohibits forced driving of the subordinate fuel pump 3 during the purge control.

Figure 6:
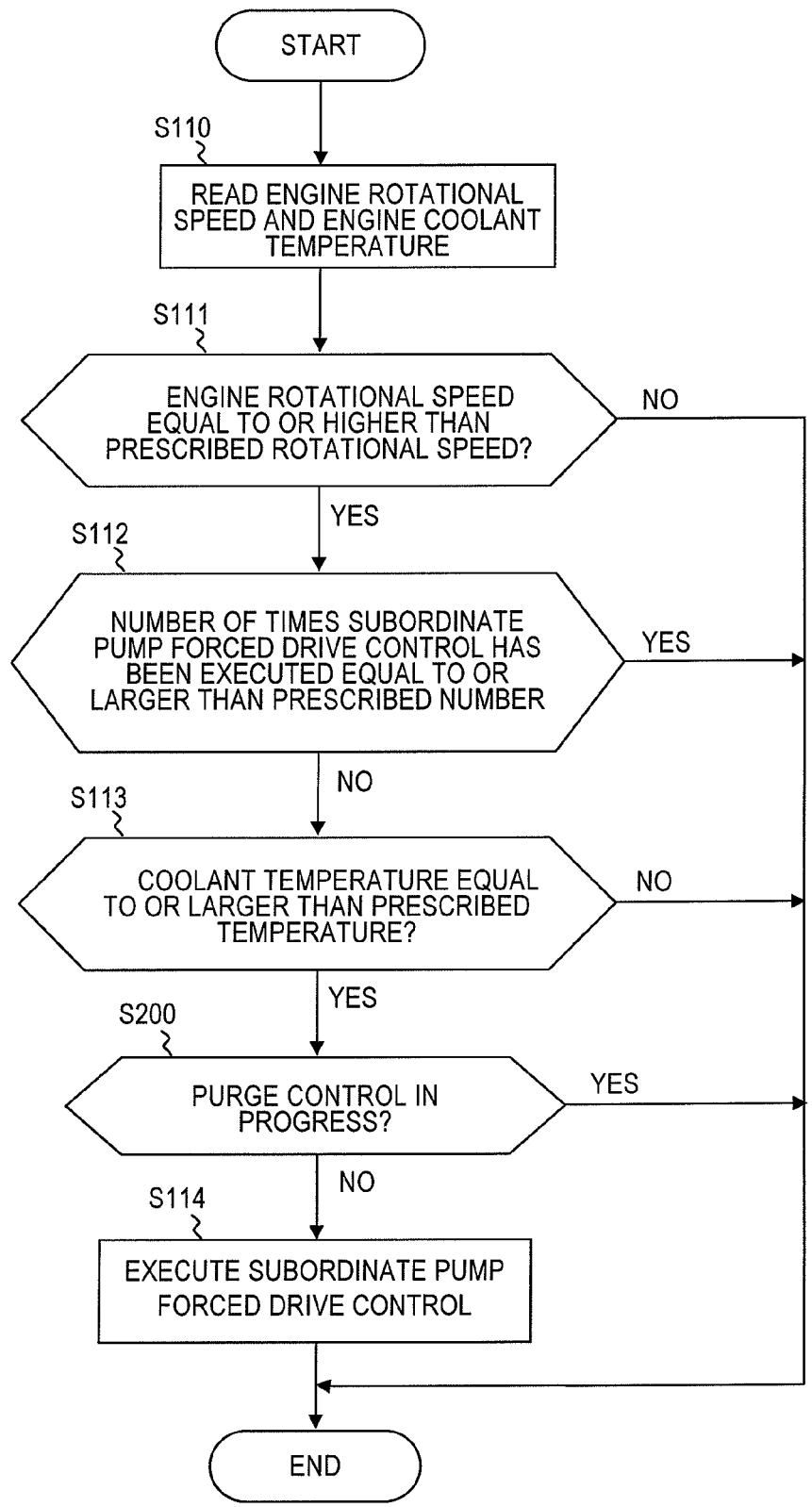
FIG. 6 is a flowchart showing a subordinate pump forced drive control in accordance with a second embodiment.

FIG. 6 is a flowchart showing the forced drive control executed with respect to the subordinate fuel pump 3 in the second embodiment.

In step S200, the controller 7 determines if the purge control is in progress. For example, the controller 7 determines if a purge value provided in a purge passage is open or not. The controller 7 ends processing of the current cycle if purging control is in progress and proceeds to step S114 if purging control is not in progress.

In addition to the effects of the first embodiment, the second embodiment prohibits execution of the forced drive control of the subordinate fuel pump 3 during execution of a purge control. As a result, a learned value expressing the effect of purging on the air fuel ratio is not disturbed by execution of the forced drive control and worsening of the exhaust emissions can be prevented.

Third Embodiment

A forced drive control for the subordinate fuel pump 3 that is in accordance with a third embodiment will now be explained with reference to FIG. 7. The third embodiment differs from the first embodiment in that a fuel injection pulse width applied to the fuel injectors is shortened during forced drive control of the subordinate fuel pump 3. The third embodiment will be explained chiefly based on its differences with respect to the first embodiment.

As explained previously, during the forced drive control of the subordinate fuel pump 3, the output fuel quantity increases in accordance with the output of the subordinate fuel pump 3. Since the control fuel pressure of the pressure regulator increases due to the increased output fuel quantity, the fuel injection quantity, will also increase if the injection time of the fuel injectors is left the same.

Therefore, in this embodiment, the valve open duration of the fuel injectors is shortened during forced driving of the subordinate fuel pump 3 by shortening a fuel injection pulse width that is applied to the fuel injectors. As a result, even though the control fuel pressure changes during the forced drive control, a quantity of fuel that is appropriate based on the operating conditions can be injected.

Figure 7:
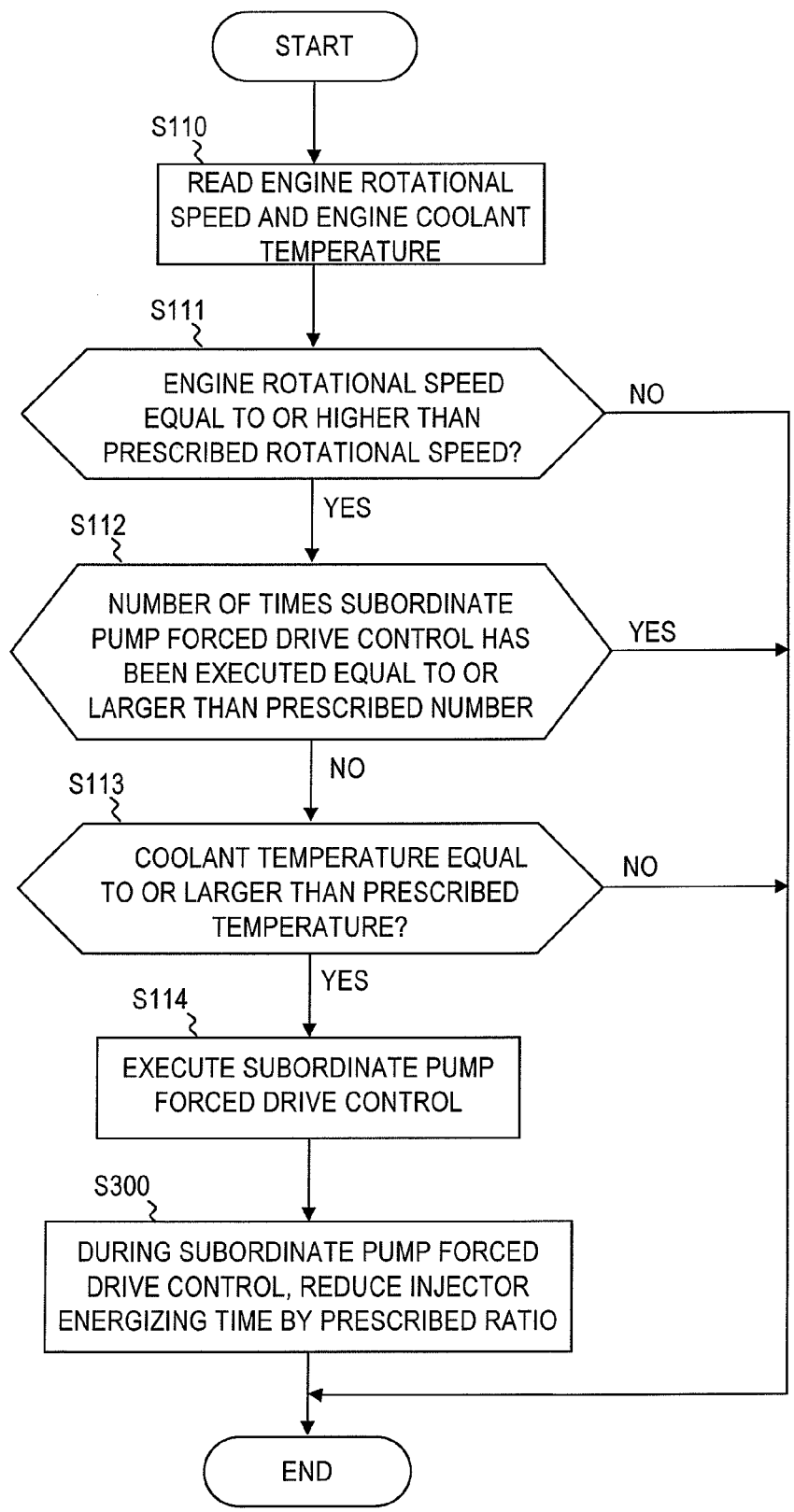
FIG. 7 is a flowchart showing a subordinate pump forced drive control in accordance with a third embodiment.

FIG. 7 is a flowchart showing the forced drive control executed with respect to the subordinate fuel pump 3 in the third embodiment of the present invention.

In step S300, the controller 7 reduces the amount of time that the fuel injectors are energized during the forced drive control of the subordinate fuel pump 3 by a prescribed ratio. More specifically, the fuel injection pulse width fed to the fuel injectors is shortened. Since shortening the fuel injection pulse width shortens valve open duration of the fuel injectors, an appropriate quantity of fuel can be injected even though the control fuel pressure increases.

In addition to the effects obtained with the first embodiment, the third embodiment is configured to shorten the fuel injection pulse width fed to the fuel during the forced drive control of the subordinate fuel pump 3. As a result, even though the control fuel pressure changes during the forced drive control, a quantity of fuel that is appropriate based on the operating conditions can be injected into the engine.

Fourth Embodiment

A forced drive control for the subordinate fuel pump 3 that is in accordance with a fourth embodiment will now be explained with reference to FIG. 8. The fourth embodiment differs from the first embodiment in that during forced drive control of the subordinate fuel pump 3, the voltage applied to the main fuel pump 2 is decreased by a prescribed value. The fourth embodiment will be explained chiefly based on its differences with respect to the first embodiment.

As explained previously, during the forced drive control of the subordinate fuel pump 3, the output fuel quantity increases in accordance with the output of the subordinate fuel pump 3. Since the control fuel pressure of the pressure regulator changes due to the increased output fuel quantity, the fuel injection quantity, too, will increase if the injection time of the fuel injectors is left the same.

Therefore, this embodiment is configured to reduce the voltage applied to the main fuel pump 2 by a prescribed value during the forced drive control of the subordinate fuel pump 3 such that the output fuel quantity (quantity of fuel pumped from the fuel tank 1) is substantially equal to the output fuel quantity obtained when only the main fuel pump 2 is driven. As a result, the control pressure of the pressure regulator is prevented from changing and the fuel injection quantity is held constant.

Figure 8:
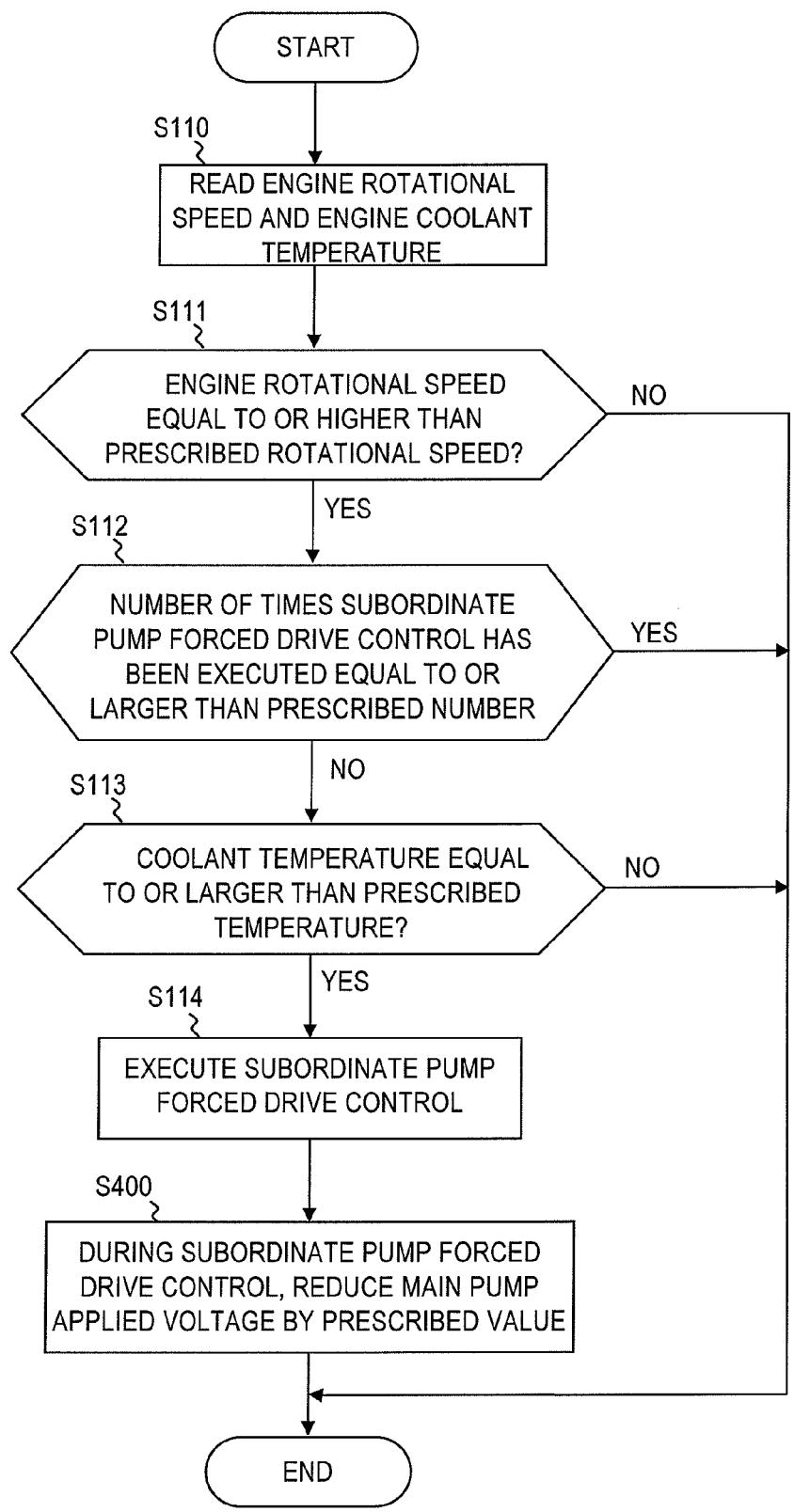
FIG. 8 is a flowchart showing a subordinate pump forced drive control in accordance with a fourth embodiment.

FIG. 8 is a flowchart showing the forced drive control executed with respect to the subordinate fuel pump 3 in the fourth embodiment of the present invention.

In step S400, the controller 7 reduces the terminal voltage applied to the main fuel pump 2 by the prescribed value during the forced drive control of the subordinate fuel pump 3. As a result, the output flow rate of the main fuel pump 2 is reduced.

Figure 9:
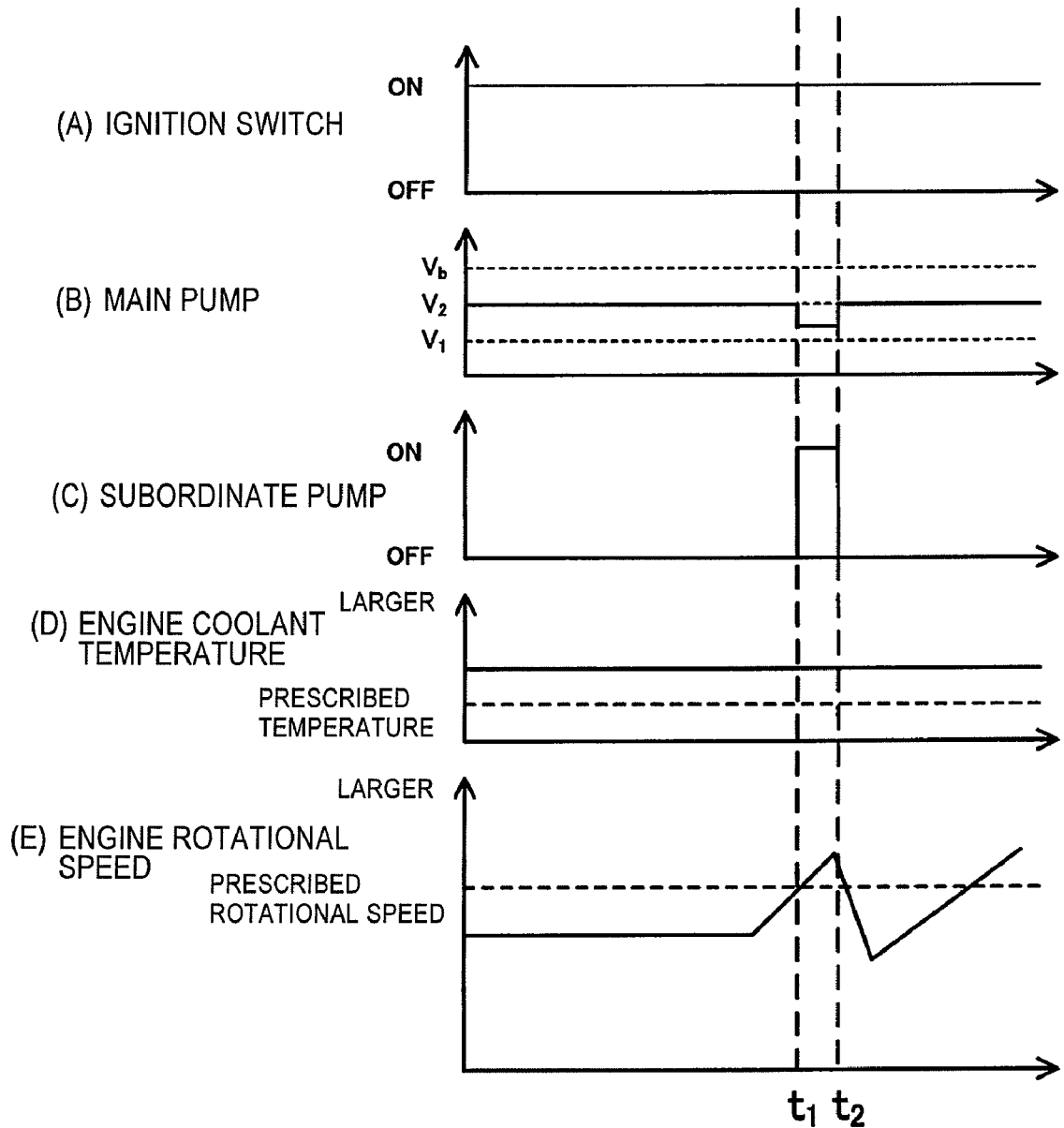
FIG. 9 is a time chart illustrating the operations of the various components during forced drive control of the subordinate pump in accordance with the fourth embodiment.

FIG. 9 is a time chart illustrating the operations of the various components during forced drive control of the subordinate fuel pump 3 in accordance with the fourth embodiment.

At a time t1, the engine rotational speed exceeds a prescribed rotational speed (see, part (E) of FIG. 9, "Yes" in step S111), the engine coolant temperature is equal to or above a prescribed temperature (see, part (D) of FIG. 9, step S113), and the number of times the subordinate fuel pump 3 has been forcefully driven during the current trip is 0 ("No" in step S112). Therefore, the subordinate pump drive relay 5 is turned on for a prescribed amount of time. As a result, the subordinate fuel pump 3 is forcefully driven for a prescribed amount of time (see, part (C) of FIG. 9, step S114) when the engine is in a stabilized state.

During the forced drive control of the subordinate fuel pump 3, the voltage applied to the main fuel pump 2 is reduced by a prescribed value (see, part (B) of FIG. 9, step S400) such that the output fuel quantity is substantially equal to the output fuel quantity obtained when only the main fuel pump 2 is driven. As a result, the control pressure of the pressure regulator is prevented from changing and the fuel injection quantity is held constant.

At a time t2, the prescribed amount of time elapses and the subordinate pump drive relay 5 is turned off, thus ending the forced drive control of the subordinate fuel pump 3 (see, part (C) of FIG. 9). Simultaneously, the applied voltage of the main fuel pump 2 is returned to a normal voltage value from a value reduced by the prescribed value (see, part (B) of FIG. 9).

In addition to the effects obtained with the first embodiment, the fourth embodiment is configured to decrease the voltage applied to the main fuel pump 2 by a prescribed value during forced drive control of the subordinate fuel pump 3. As a result, the control fuel pressure of the pressure regulator is preventing from changing and the fuel injection quantity can be held constant.

For example, although the embodiments execute the forced drive control of the subordinate fuel pump 3 when the engine rotational speed is equal to or above a prescribed rotational speed, it is also acceptable to use other engine operating conditions (e.g., an engine load or a fuel injection quantity) as a substitute value for determining if the engine rotational speed is equal to or above the prescribed value. In other words, the subordinate fuel pump 3 can be driven when the engine load is equal to or above a prescribed load or when the fuel injection quantity is equal to or larger than prescribed quantity. It is possible for the engine load to be high even though the rotational speed of the engine is comparatively low and, in such a case, the operating sound level of the subordinate fuel pump 3 during forced driving would be noticeable as noise to passengers of the vehicle. However, since situations in which the engine operates in a high load operating state while the engine rotational speed is low do not occur very often, it is certainly feasible to use the engine load or the fuel injection quantity as a substitute value for the engine rotational speed.

In the embodiments, the forced drive control of the subordinate fuel pump 3 is executed when the engine rotational speed is equal to or above a prescribed rotational speed without regard for the currently selected gear position of the transmission. However, it is acceptable to change the prescribed rotational speed at which the forced drive control of the subordinate fuel pump 3 is executed in accordance with the currently selected gear position. For example, when the gear position is high, such background noises as air flow noise and road noise are larger because the vehicle speed is higher. Consequently, when the gear position is high, it is acceptable to lower the engine rotational speed at which the forced drive control of the subordinate fuel pump 3 is executed.

Although in the embodiments the voltage applied to the main fuel pump 2 is set to $V_1$ volts when the engine is in a low load operating region, $V_2$ volts when the engine is in a medium load operating region, and Vb volts when the engine is in a high load operating region, the applied voltage value does not need to be limited to these operating regions.

Although the forced drive control of the subordinate fuel pump 3 is prohibited during a purge control in the second embodiment, it is also acceptable to prohibit the collection of purge learning data during execution of the forced drive control of the subordinate fuel pump 3.

General Interpretations of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine fuel pump control apparatus comprising:
   a low load fuel pump control section configured to control a main fuel pump for supplying fuel to an engine when an operating condition indicates that the engine is operating with a low load;
   a high load fuel pump control section configured to control to the main fuel pump and a subordinate fuel pump for supplying fuel to the engine when the operating condition indicates that the engine is operating with a high load; and
   a subordinate pump drive section configured to drive the subordinate fuel pump for a prescribed period of time when a rotational speed of the engine is equal to or higher than a prescribed rotational speed while the engine is operating in an low load operating region in which the low load fuel pump control section controls the main fuel pump for supplying fuel to the engine.

2. The engine fuel pump control apparatus recited in claim 1, wherein
   the subordinate pump drive section sets the prescribed rotational speed based on a background noise level with respect to an operating sound level of the subordinate fuel pump.

3. The engine fuel pump control apparatus recited in claim 2, wherein
   the subordinate pump drive section sets the prescribed rotational speed to a lower rotational speed value as the background noise level becomes larger.

4. The engine fuel pump control apparatus recited in claim 1, wherein
   the subordinate fuel pump drive section is configured to limit a number of times the subordinate fuel pump is driven to a prescribed number or smaller during a period from when the engine is started until the engine is stopped.

5. The engine fuel pump control apparatus recited in claim 1, further comprising
   a subordinate fuel pump drive prohibiting section configured to prohibit the subordinate fuel pump from being driven by the subordinate fuel pump drive section during a purge control in which evaporated fuel adsorbed to a canister is purged to an intake passage while the engine is operating.

6. The engine fuel pump control apparatus recited in claim 1, further comprising
   a fuel injection quantity calculating section configured to calculate a fuel injection quantity in accordance with an engine operating state; and
   a fuel injection quantity revising section configured to revise a fuel injection pulse width calculated by the fuel injection quantity calculating section while the subordinate fuel pump is being driven by the subordinate fuel pump driving section in order to compensate for an increase in fuel pressure resulting from the subordinate fuel pump being driven.

7. The engine fuel pump control apparatus recited in claim 1, further comprising
   a main fuel pump output flow rate lowering section configured to lower an output flow rate of the main fuel pump while the subordinate fuel pump is being driven by the subordinate fuel pump drive section.

8. The engine fuel pump control apparatus recited in claim 7, wherein
   the main fuel pump is an electric powered fuel pump with the output flow rate being variable in accordance with a command voltage value; and
   the main fuel pump output flow rate lowering section is configured to lower a voltage applied to the main fuel pump for lowering the output flow rate of the main fuel pump while the subordinate fuel pump is being driven by the subordinate fuel pump drive section.

9. The engine fuel pump control apparatus recited in claim 1, wherein
   the subordinate pump drive section sets the prescribed period of time to correspond to an amount of time required for the fuel inside the subordinate fuel pump to be replaced.

10. An engine fuel pump control apparatus comprising:
    low load fuel pump control means for controlling a main fuel pump for supplying fuel to an engine when an operating condition indicates that the engine is operating with a low load;
    high load fuel pump control means for controlling the main fuel pump and a subordinate fuel pump for supplying fuel to the engine when the operating condition indicates that the engine is operating with a high load; and
    subordinate pump drive means for driving the subordinate fuel pump for a prescribed period of time when a rotational speed of the engine is equal to or higher than a prescribed rotational speed while the engine is operating in an low load operating region in which the low load fuel pump control means controls the main fuel pump for supplying fuel to the engine.

11. An engine fuel pump control apparatus comprising:
    controlling a main fuel pump for supplying fuel to an engine when an operating condition indicates that the engine is operating with a low load;
    controlling the main fuel pump and a subordinate fuel pump for supplying fuel to the engine when the operating condition indicates that the engine is operating with a high load; and
    driving the subordinate fuel pump for a prescribed period of time when a rotational speed of the engine is equal to or higher than a prescribed rotational speed while the engine is operating in an low load operating region in which the main fuel pump supplies fuel to the engine.

* * * * *